M. J. RYAN & J. KIEL.
GANG PLOW.
APPLICATION FILED APR. 8, 1911.
1,196,293.
Patented Aug. 29, 1916.
2 SHEETS—SHEET 2.
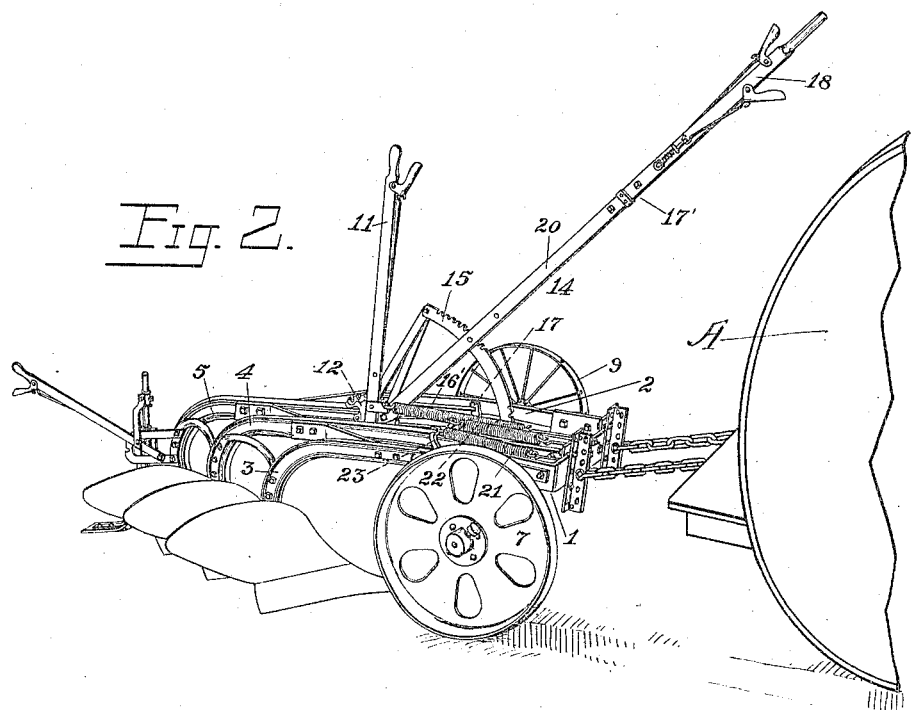
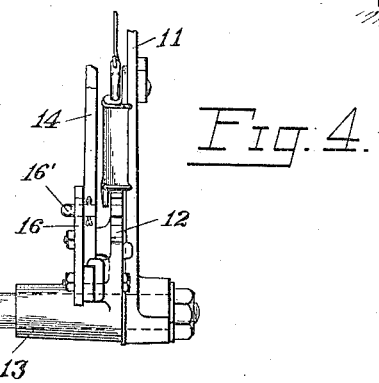
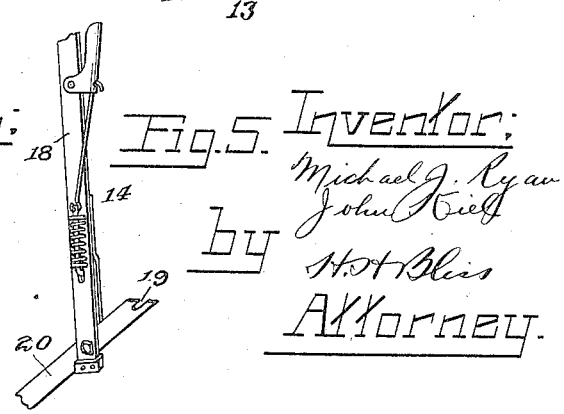

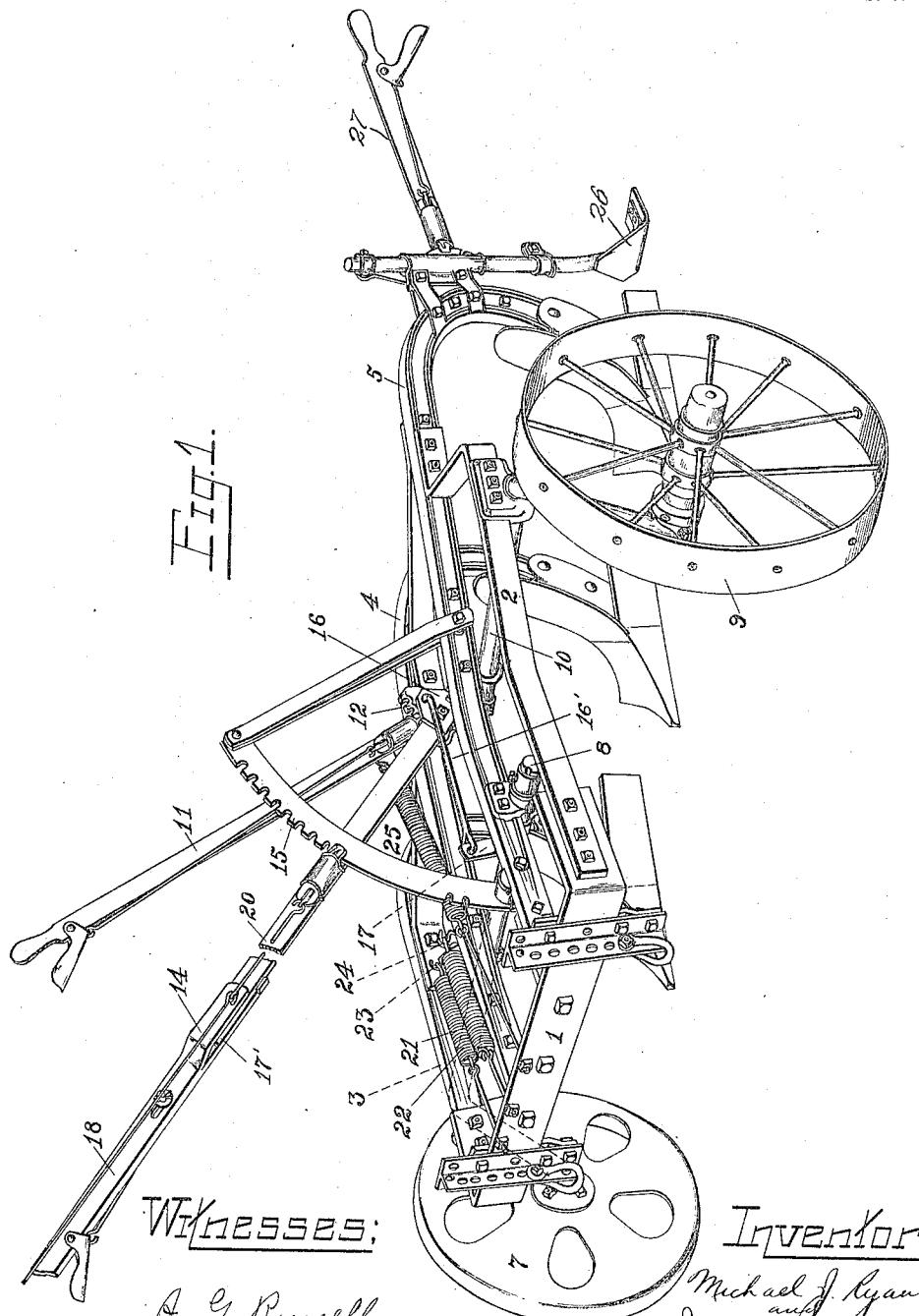

UNITED STATES PATENT OFFICE.

MICHAEL J. RYAN, OF FARGO, NORTH DAKOTA, AND JOHN KIEL, OF MOLINE, ILLINOIS, ASSIGNORS TO DEERE AND COMPANY, OF MOLINE, ILLINOIS, A CORPORATION OF ILLINOIS.

GANG-PLOW.

1,196,293.  Specification of Letters Patent.  Patented Aug. 29, 1916.

Application filed April 8, 1911. Serial No. 619,849.

*To all whom it may concern:*

Be it known that we, MICHAEL J. RYAN, a citizen of the United States, residing at Fargo, in the county of Cass and State of North Dakota, and JOHN KIEL, a citizen of the United States, residing at Moline, in the county of Rock Island and State of Illinois, have invented certain new and useful Improvements in Gang-Plows, of which the following is a specification, reference being had therein to the accompanying drawings.

Our invention relates to improvements in gang plows and especially to gang plows adapted to be drawn by a traction engine.

The general object of the invention is the provision of a gang plow of moderate capacity which is adapted to be coupled to a traction engine and having devices for raising and lowering the plows of such a nature that the entire outfit, *i. e.*, both engine and plow, can be operated efficiently and easily by one person.

A further object is the provision of manual plow raising and lowering means arranged to extend forward adjacent the engineer's platform of the traction engine and of such a nature that it will not strike and interfere with the engine when the machine is being turned at corners.

A further object is the provision of a ground support for the plow frame of such a nature that the individual plows can be lifted well above the ground and that the machine will not tend to crowd forward upon the engine when the individual plows are raised and the machine is being transported.

Referring to the drawings in which similar letters indicate identical parts in all the figures—Figure 1 is a perspective view of a plow embodying our improvements taken from the front and landward side of the plow. Fig. 2 is a persective view of the plow taken from the front and furrow side thereof, and showing in outline the rear end of a tractor to which the plow is connected. Figs. 3 and 4 are detail views of the lever connections. Fig. 5 is a detail of a jointed lever.

1 and 2 are respectively front and side bars forming a gang-frame carrying brackets, to which are firmly secured plow-beams 3, 4, and 5, spaced and rigidly connected. The furrow end of bar 1 is bolted to the forward end of the beam 3, the end of the bar being bent to form a bracket corresponding to the brackets to which the beams 4 and 5 are secured. The rear end of the side-bar 2 is bolted to the rearward portion of the beam 5, and to the bar 1 at its forward end, but is dispensed with, on gangs having more than three plows, the landward plow-beams being substituted therefor. The plows mounted on the beams 3, 4, and 5, are of a well known type, but any style of plow desired may be used. A furrow-wheel 7 is journaled on a crank-arm of an axle 8 extending transversely of the beams and mounted and rockable in bearings thereon. A land-wheel 9 is similarly journaled on a crank-arm of an axle 10 extending transversely of the beams and mounted and rockable in bearings on the landward side of the gang, in this instance in bearings on the bar 2 and beam 5; it will be readily apparent, however, that where a plow-beam is substituted for the bar 2, the axle bearings of the axle 10 will be on the plow-beams solely. The axles 8 and 10 are located one in advance of the other; the crank-arms carrying the wheels 7 and 9 project downwardly and forwardly, and both wheels operate in a substantially vertical position.

On the inner end of the axle 10, and rigid therewith and approximately central of the gang, is a lever 11, provided with a latch engaging with a segment-rack 12 which is secured on, or integral with, a sleeve 13 on the axle 10, and movable thereon. A forwardly projecting lever 14, is bolted, or otherwise secured to the segment-rack 12, and is provided with a latch engaging with a segment rack 15 mounted on the plow-beams 5. An arm 16, secured on the lever 14, is connected, by a link 16', with a rock-arm 17 on the axle 8. The lever 14 extends forwardly to within easy reach of an operator on the rear of a traction engine, usually employed with gang-plows, and in order to obviate the possibility of the lever 14 contacting with any part of the engine when the latter is turning, we construct it with a joint, as at 17', where the grip-end 18 is pivoted to fold rearwardly when the latch thereon is disengaged from the slot 19 in the main part 20 of the lever.

An upward and rearward movement of the lever 14 will rock both axles rearwardly, swinging the crank-arms and wheels thereon forwardly to lower the gang ready for plowing. The depth to be plowed, having been determined, the lever 11 is operated to rock the axle 10, swinging the crank-arm and land-wheel to level the gang. A forward and downward movement of the lever 14 will rock both axes forwardly swinging the crank-arm and wheels rearwardly and raising the gang from the ground.

Springs 21 and 22 are connected to rock arms 23 and 24 on the axle 8 and to the bar 1 of the main frame to assist in raising the plows, and the spring 25 is connected to the lever 11 and bar 1 to assist in the forward movement of this lever.

Clevises on the bar 1 connect the plow frame to the tractor, which is designated as an entirety by A, by means of chains or the like, the connection being relatively close so that the engine driver standing on the engine platform can readily reach the operating lever 14, as set forth above. A vertically adjustable castering shoe 26 is mounted in the rear of beam 5, and is operable by lever 27 to raise or lower the rear of the gang. While the plow is working the shoe 26 is secured in its raised position, but when the plows have been brought out of the soil by swinging the ground wheels 7 and 9 downward and rearward the plows can be further elevated and lifted well above the ground by actuating the lever 27 to force the shoe 26 donward relative to the main frame parts; and when the plows have been thus elevated and the machine is being transported, the shoe 26 acts as a brake and prevents the machine crowding forward on the engine when going down grade.

We have found that by placing the levers 11 and 14 centrally of the gang and inclined forwardly within easy reach of the operator, a greater and more perfect degree of control is obtained with a minimum amount of labor.

The above described raising of the plows by the hand lever 14, even to the number of five plows, is accomplished with comparative ease by the engine driver in his position on the engine platform by reason, principally, of two characterizing features of the structure. In the first place, the two ground wheels are so disposed and connected with the main frame that their adjustment raises the front part of said frame and, in so doing, inclines the points of the plows upward so that the force of the draft in connection with the action of the soil greatly assists the operator in bringing the plows out of the ground. Again, the force of the draft is further taken advantage of by reason of the fact that the two supporting wheels are mounted upon crank arms that extend downwardly and forwardly when the plows are lowered in operative position. By reason of this arrangement the backward reaction of the soil on the wheels acts very materially to effect the swinging of the wheel axles which raises the frame of the machine.

We are aware that it has been proposed heretofore to mount lifting wheels on crank axles under the front of a plow frame for the purpose of lifting the plows, but these proposals, so far as we are aware, have been in connection with horse-drawn machines with one or two plow bottoms and the lifting devices have been actuated by the driver from his position on the ground or in a seat on the main frame of the plow. It has also been proposed in the case of tractor-drawn gang plows to provide lifting wheels on forwardly inclined cranks for the individual plow frames or beams which are coupled to the main frame of the plow, the lifting wheels being actuated by a plowman on the main frame or platform of the plow. We believe, however, that we are the first to provide a gang plow having a main frame hitched close to a tractor, a plurality of plows secured rigidly to the main frame, supporting and lifting wheels mounted on crank arms having bearing connections with the main frame at points in front of the plows, and means for swinging the supporting wheels consisting of a hand lever extending forward to points adjacent the platform of the tractor so that it can readily be grasped and actuated by the engine driver. In providing a machine with these features we have made it possible for the engine driver, while standing in his place on the engine platform, to readily control the plow as well as the engine, raising from three to five plows from the ground with comparative ease by the single actuation of the one lever, and so far as we are aware, such manual operation of such a gang of plows has never been accomplished prior to our invention.

The shoe or support 26 when the plow bodies are at work, rides upon the bottom of the new furrow, being locked in that position and serving to assist in preventing the plows from running too deep. As soon as the wheels are unlocked and begin to roll backward and cause the cranks to raise the front end of the beam, the shoe or support begins to exert a stopping action upon the rear part of the plow system without interfering with the points of the bodies from tilting upward. The shoe follows the bodies to the surface of the ground; and then force can be applied to it through the lever 27, whereby the bodies are still further elevated and are locked in such position that no ordinary obstructions can contact with them.

We claim as our invention:—

1. A plow mechanism adapted to be drawn by a tractor, having, in combination, a main plow frame, a plurality of diagonally arranged plow bodies rigidly connected to each other and to the frame, a front furrow wheel, a land wheel, said wheels being adapted to be relatively stationary while the frame advances and cause the raising of the frame at the front end, and simultaneously tilt upward the points of the plows and cause them to move to the surface of the ground while the frame is advancing and the wheels are relatively stationary, a vertically adjustable ground support at the rear of the bodies arranged to run in the furrow, and actuating means for forcing said support downward in relation to the frame to lift the bodies and frame and secure them in position to carry the bodies at a distance above the bottom of the support greater than the distance between them when in the furrow.

2. A plowing mechanism adapted to be drawn by a tractor, having, in combination, a main plow frame, a plurality of diagonally arranged plows rigidly connected to each other and to the frame, a front furrow wheel, a land wheel, crank arms for said wheels hinged to the forward part of said frame and normally inclined forward and downward, and adapted to permit said wheels at option to be relatively stationary while the crank arms are swinging backward and the frame is moving forward under force from the draft and moving upward under force from the wheels, the plow bodies being arranged to have their points tilted upward by the frame as it rises, whereby they are caused to rise to the surface of the ground, a vertically adjustable ground-contacting shoe or support at the rear of the plows arranged to run in the furrow, and power-applying devices for lifting the bodies on the said support beyond the normal distance from the bottom of the support. and holding the bodies in elevated position.

In testimony whereof we affix our signatures, in presence of two witnesses.

MICHAEL J. RYAN.

Witnesses:
H. AMERLAND,
PAUL E. SIMMONS.

Fargo, North Dakota, February 23rd, 1911.

JOHN KIEL.

Witnesses:
A. A. CONWELL,
H. E. RICH.

Moline, Illinois, February 27th, 1911.

Copies of this patent may be obtained for five cents each, by addressing the "Commissioner of Patents, Washington, D. C."